United States Patent

Vrouwenvelder

[11] Patent Number: 5,674,547
[45] Date of Patent: Oct. 7, 1997

[54] APPARATUS AND METHOD FOR FORMING A STRAND OF DOUGH

[75] Inventor: Cornelis Curinus Vrouwenvelder, 's-Hertogenbosch, Netherlands

[73] Assignee: J.H. Kaak Holding B.V., 's-Hertogenbosch, Netherlands

[21] Appl. No.: 446,594

[22] PCT Filed: Nov. 19, 1993

[86] PCT No.: PCT/NL93/00244

§ 371 Date: Aug. 23, 1995

§ 102(e) Date: Aug. 23, 1995

[87] PCT Pub. No.: WO94/12037

PCT Pub. Date: Jun. 9, 1994

[30] Foreign Application Priority Data

Nov. 20, 1992 [NL] Netherlands ................ 9202023

[51] Int. Cl.⁶ .................... A21C 3/00; A21D 6/00
[52] U.S. Cl. ............... 426/500; 99/371; 99/372; 99/321; 426/517
[58] Field of Search .................. 426/500, 512, 426/517; 425/371, 372, 321, 392

[56] References Cited

U.S. PATENT DOCUMENTS

| | | | |
|---|---|---|---|
| 4,464,105 | 8/1984 | Voegtlin | 425/364 R |
| 4,767,638 | 8/1988 | Uhrovic | 426/500 |
| 5,059,440 | 10/1991 | Hayashi | 426/517 |
| 5,330,344 | 7/1994 | König | 425/372 |

FOREIGN PATENT DOCUMENTS 0 478 242 A1  9/1991  European Pat. Off. .

*Primary Examiner*—George Yeung
*Attorney, Agent, or Firm*—Pennie & Edmonds, LLP

[57] ABSTRACT

Apparatus and method for forming a strand of dough from a relatively short dough body. The apparatus comprises two pressure members, respectively provided with facing first and second dough contact surfaces. The apparatus further comprises means for keeping the two dough contact surfaces spaced from each other in order to define a transforming space for the dough body between them. Furthermore, the apparatus has means for reciprocating both dough contact surfaces in relation to each other and in relation to a constant relative position of both dough contact surfaces, in a direction essentially parallel to both dough contact surfaces. In the method, the piece of dough is placed between the two contact surfaces and the contact surfaces are reciprocated in relation to each other.

11 Claims, 1 Drawing Sheet

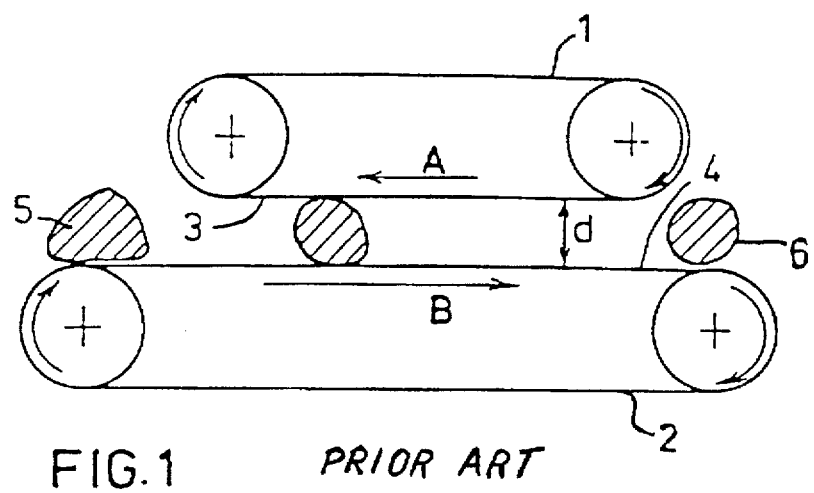
FIG.1 PRIOR ART
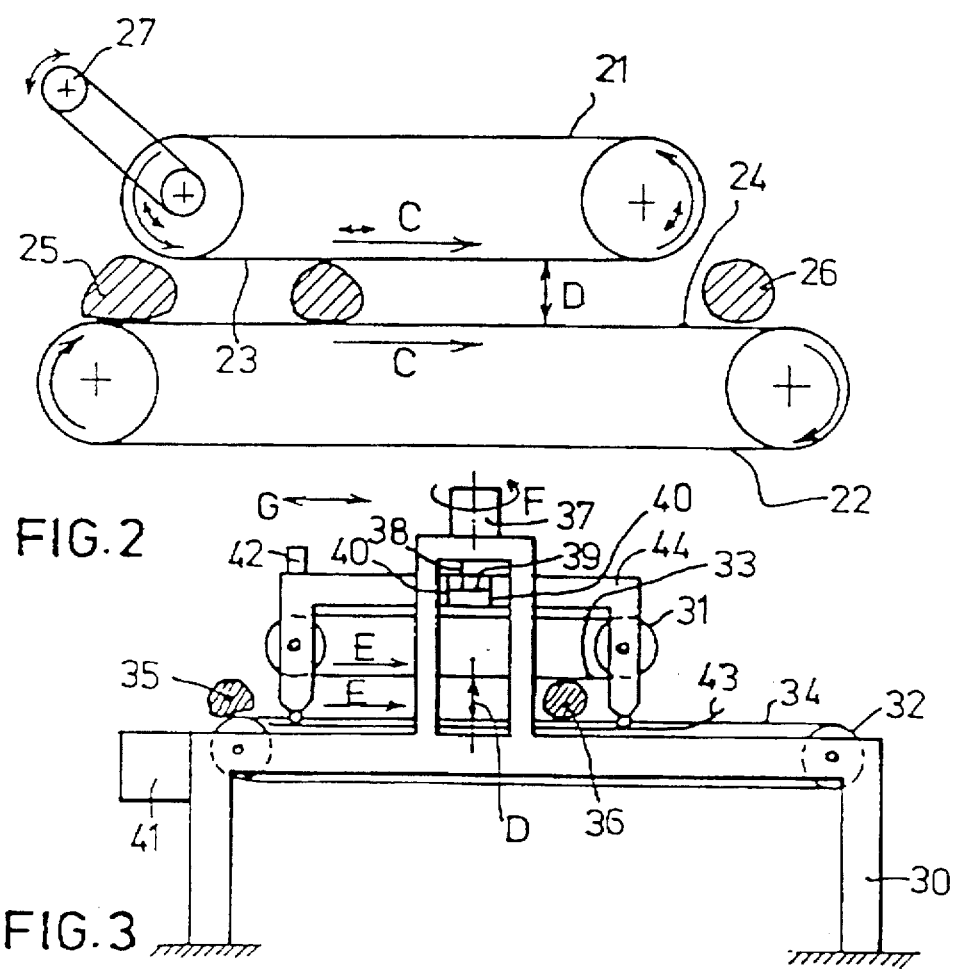
FIG.2
FIG.3

APPARATUS AND METHOD FOR FORMING A STRAND OF DOUGH

The invention relates to an apparatus for forming a strand of dough from a relatively short dough lump, comprising a first pressure member and a second pressure member, provided with facing first and second dough contact surfaces respectively, said second pressure member being a conveyor belt for transporting the dough lump along a transport direction, means for keeping the two dough contact surfaces spaced from each other in order to define a transforming space for the dough lump between them. The invention further relates to a method for forming a strand of dough from the aforementioned dough lump.

What is known is an apparatus for forming a strand of dough comprising (see FIG. 1) two belt conveyors 1, 2, each provided with a dough contact surface 3 and 4 respectively, and with driving means. The facing dough contact surfaces 3, 4 of the belt conveyors 1, 2 are spaced from each other at a distance d and are essentially parallel to each other. Both contact surfaces 3, 4 herein define an intermediate space extending from left to right (seen on FIG. 1), wherein-the left-hand end of the intermediate space forms the feeding space for the dough lump, and the right-hand end forms the discharge or exit end for the strand of dough. When operating, the lower belt conveyor 2 is driven in such a way that the contact surface 4 thereof moves along the intermediate space from left to right (direction B) and the belt conveyor 1 is driven in such a way that the contact surface 3 moves along the intermediate space from right to left (direction A). Belt conveyor 2 is herein driven at a greater speed than belt conveyor 1. When the dough lump 5, having a thickness which is greater than d, is placed on the left side on the contact surface 4, it is taken along into the intermediate space by the contact surface 4. Having arrived there, the dough lump is subjected to a rotation by the contact surface 3 which moves in opposite direction. Because of the difference in direction and magnitude of the belt speeds, together with the pressure exercised by the contact surfaces, the dough lump 5 is formed into a round strand of dough 6, depicted on the discharge end.

In practice it has become clear that a strand of dough which has thus been formed will already display a shape which is not straight during the transformation and further working. Thus, the strand of dough will, upon falling off the belt conveyor, which occurs regularly with the mechanical working of dough, for instance when it is transferred onto another belt conveyor, take on a Ω-shape. Such a shape is extremely undesirable for the further working into a final-bread product.

It has appeared that a strand of dough which has been formed in this way is twisted in relation to the basic material. Partly as a consequence of the variation in diameter of the basic material, a torsional force is applied to the dough in the lump in the known apparatus during passage thereof through the intermediate space, as a consequence of which the strand of dough has considerable torsional forces just prior to leaving the intermediate space. At the moment at which the strand of dough leaves the intermediate space, these forces are relaxed at least partially, a consequence being that the strand of dough abandons the stretched shape. The twisting of the cross-sectional surfaces in relation to each other in the dough body also disadvantageously affects the structure of the dough.

It is an object of the invention to provide an apparatus and a method for making modelled dough portions having, in particular, a relatively great length, the so-called strands of dough, which remain almost straight during further working and ultimately provide an almost straight bread product, for instance a French loaf.

To this end the invention provides an apparatus for forming a strand of dough as defined in the preamble, which is characterized by means for, during transport of the dough lump, reciprocating at least one of the dough contact surfaces, in a direction essentially parallel to the transport direction.

Because the dough contact surfaces may be subjected to a reciprocating movement in relation to each other, both dough contact surfaces are preferably driven at an essentially equal speed and in a parallel manner so that they remain, on balance, in a similar position in relation to each other whereby the dough lump will, on its way to its shape as a strand of dough, in each cross-section be rolled or rotated substantially as much into one direction as into the opposite direction. Thus, almost no torsion is introduced into the strand of dough, so that the strand of dough which comes out of the discharge end continues to retain its straight shape, will be homogeneous in thickness and structure across almost the entire length and may in very many cases have already been given its final length. Moreover, the strand of dough is far more flexible, thus further promoting a possible further working thereof, for instance giving it its final desired length, having the desired tolerances.

The apparatus according to the invention can be arranged for relatively reciprocating both dough contact surfaces. For reasons of simplicity it is preferred, however, that the reciprocating means are arranged for reciprocating only one of the dough contact surfaces.

In an embodiment of the apparatus according to the invention it is preferred, for a continuous mechanical transformation of dough lumps, that the apparatus comprises means for driving the dough contact surfaces at essentially equal speed and in a parallel manner. During operation of this apparatus dough lumps can, one after another, be introduced in a continuous manner on the feeding side of the intermediate space, and on the discharge side the formed strands of dough can be received one after another for further working. Here, the dough contact surfaces move in an absolute sense but, considered averaged in time, essentially not in a relative sense in relation to each other.

The first pressure member is preferably formed as a belt conveyor, wherein both belt conveyors in their turn are preferably provided with belts of which the dough contact surfaces are formed by a low-profiled plastic such an embodiment of the belt conveyors has deliberately been avoided in the known apparatus discussed above. In the known apparatus, the belts of the belt conveyors are coated with a layer of felt to keep the disadvantageous frictional effect of the constant movement of both contact surfaces on the dough structure in the same direction along the surface of the dough lump to a minimum since what in fact happens all the time in the apparatus according to the invention is a restoration into the previous condition, it is possible to use belts having a rough surface, for instance the so-called negative-pyramid belts, which can be made of polyethylene, PVC or teflon and the like. The advantage of such belts is that they are stronger and easier to keep clean.

According to another aspect of the invention there is provided a method for transforming a relatively short dough lump into a strand of dough, wherein the dough lump is placed between a first and a second dough contact surface, said second dough contact surface being driven for transporting the dough lump along a transport direction, characterized in that at least one of the dough contact surfaces is reciprocated in a direction essentially parallel to the transport direction during transport of the dough lump and at an intermediate distance which is smaller than at least a transverse dimension of the dough lump.

Preferably, the stroke of the reciprocating movement is herein about $2\pi$ times the distance between the dough pressing surfaces. It has appeared that hereby, in general, an optimally modelled strand of dough can be obtained. The emphasis is on "in general", because the composition of the dough may vary greatly, for instance with an eye to different final products.

By way of example some embodiments of the invention will hereafter be described, referring the drawing, in which:

FIG. 1 shows a schematic side view of the known apparatus for forming a strand of dough as discussed above;

FIG. 2 shows a schematic side view of a first embodiment of the apparatus according to the invention for forming a strand of dough; and FIG. 3 shows a schematic side view of a second embodiment of the apparatus according to the invention for forming a strand of dough.

The first embodiment of the apparatus according to the invention represented in FIG. 2 comprises two belt conveyors having two conveyor belts 21 and 22 with facing contact surfaces 23 and 24 respectively. The two belt conveyors are kept in alignment in such a way, the one above the other, in a frame which is not shown, that the dough contact surfaces 23, 24 are at a distance D from each other. The conveyor belts 21, 22 are driven in such a way by driving means (not shown), that the direction and the average speed of the contact surfaces 23, 24 (indicated by arrows C) are at least substantially similar. The distance D is chosen in such a way, that a quantity of dough 25 which is to be formed into a strand of dough experiences a pressure when this quantity of dough 25 is in the intermediate space between the contact surfaces 23, 24. In the example shown in FIG. 2, a reciprocating movement is superposed on the belt speed of conveyor belt 21 by a modulation means 27, which is preferably integrated with the driving means of the conveyor belt 21. The belt speed of the conveyor belt 22 herein remains constant. The superposed movement is independent from the average transmission movement of the conveyor belt 21. This superposed movement causes the quantity of dough 25 to be rolled forwards and backwards between the contact surfaces 23, 24 during the displacement, so that a strand of dough 26 is formed. Because the quantity of dough 25, in contrast to what happens in the known apparatus, is not continuously rotated, no torsional stresses are generated in the dough, so the strand of dough is free of stress and can retain its straight shape during further working.

The reciprocating movement preferably has a stroke of $2\pi D$ or roughly twice the circumference of the strand of dough to be formed. Owing to this, the quantity of dough 25 which is to be transformed into the strand of dough is each time rolled twice into one direction, and then twice into the opposite direction. Such an amplitude proves, in general, to yield a strand of dough which has been modelled in the most optimal way, although for certain qualities of dough amplitudes of $\pi D$ could also yield optimal results.

The second embodiment of the apparatus according to the invention, as represented in FIG. 3, differs substantially from the one represented in FIG. 2 in that here the upper belt conveyor is reciprocated in its entirety, while keeping the speed of revolution of the belt constant.

In FIG. 3 a frame 30 can be distinguished, in which a lower belt conveyor has been mounted, having a belt 32 with contact surface 34, which belt is driven at constant speed by motor 41 in the direction E. Furthermore, an upper belt conveyor 31 is reciprocably arranged in the frame 30, said upper belt conveyor 31 having a belt with contact surface 33, which is driven in a constant manner in the direction E by means of the motor 42. The speeds of both belts are once more the same. What is special now is that the upper belt conveyor is supported in a carriage 44, being supported on both sides with rolls on a guide path 43, of which one has been represented here. At the top of the frame 30 a third motor 37 is mounted of which the exit shaft is connected to an angular driving member or eccentric 38, which is twistably mounted with its lower end in a plate 39, which is reciprocable in a direction transverse to the drawing, so crosswise within transversely running guiding bars 40 on the carriage 44. For illustrative reasons the dimension in longitudinal direction of the plate 39 and the distance between the bars 40 has been represented as being smaller than is in fact the case. The horizontal distance of the eccentric 38 to the exit shaft will be equal to the amplitude of the reciprocating movement and will for instance be $\pi D$. When the motor 37 is in operation, the rotating movement F of the exit shaft will thus be transformed into a reciprocating movement G of the carriage 44 along the guides 43.

In order to prevent that, when the strand of dough 36 comes of out the intermediate space on the right-hand side, this strand of dough would come to lie still between the two contact surfaces 32, 34 (which might be the case at the right-hand end of the stroke of the reciprocating movement of the upper belt conveyor 31), as a consequence of which the strand of dough could obtain a somewhat flattened surface and/or could be deformed because of the returning stroke, it is ensured according to the invention that this strand of dough will then move at least in relation to one of the contact surfaces 33, 34. This could for instance be realised by letting the upper belt conveyor move to the right past the right-hand end of the lower belt conveyor.

However, the solution shown in FIG. 3 is preferred. Herein the right-hand ends of the guides 43 have been turned upwards in preferably a parabolic way, thus forcing the rolls of the carriage 44, and thereby the right-hand end of the belt conveyor 31, upwards. Thus it is ensured that at the end of the conveyance of the strand of dough through the intermediate space in the direction E, no moment occurs at which the strand of dough and both contact surfaces 33, 34 have the same speed. If such a moment could occur, the contact surface 33 would then already have become free from the strand of dough.

The strand of dough formed by the apparatus and method according to the invention does not only turn out to retain its straight form during further transport and further movements, but is also more flexible and homogeneous, which would facilitate the action of giving the strand of dough the (exact) desired length and could shorten the resting periods prior to further working. Thus, the straight shape of the strand of dough is maintained, for instance, when the strand falls from one conveyor belt onto the other.

Although the invention has been described by means of an example in which the reciprocating movement has been superposed onto a conveyor belt 21, 31, it will be clear that this movement can also be superposed onto the conveyor belt 22, 32, while the conveyor belt 21, 31 has a constant speed. Moreover, reciprocating movements can also be superposed onto both conveyor belts.

The description of the invention has not gone into great detail on the subject of the conveyor belts and the driving means since these are known to a person skilled in the art.

I claim:

1. In an apparatus for forming a strand of dough (26) from a relatively short dough lump (25), comprising a first pressure member (21) and a second pressure member (22), provided with facing first (23) and second (24) elongated dough contact surfaces, respectively, extending along a transport direction, said second pressure member being a conveyor belt (22) for transporting the dough lump along said transport direction, means for keeping the two dough contact surfaces in contact with the dough lump as it is transported along said transport direction and spaced from each other in order to define a transforming space for the dough lump between them, the improvement comprising means for, during transport of the dough lump, reciprocating at least one (23) of the dough contact surfaces, in a direction essentially parallel to the transport direction.

2. In an apparatus for forming a strand of dough (26) from a relatively short dough lump (25), comprising a first pressure member (21) and a second pressure member (22), provided with facing first (23) and second (24) dough contact surfaces, respectively, said second pressure member being a conveyor belt (22) for transporting the dough lump along a transport direction, means for keeping the two dough contact surfaces spaced from each other in order to define a transforming space for the dough lump between them, the improvement comprising means for, during transport of the dough lump, reciprocating both of the dough contact surfaces in a direction essentially parallel to the transport direction.

3. Apparatus according to claim 2, further comprising means for driving both dough contact surfaces at an essentially equal speed and in a parallel manner.

4. Apparatus according to claim 3, wherein the first pressure member is formed by a conveyor belt (21).

5. Apparatus according to claim 4, wherein the conveyor belts (21, 22) have dough contact surfaces which are formed by a layer of profiled plastic.

6. In a method for transforming a relatively short dough lump into a strand of dough, wherein the dough lump is placed between a first and a second dough contact surface, said second dough contact surface being driven for transporting the dough lump along a transport direction, the improvement comprising reciprocating at least one of the dough contact surfaces in a direction essentially parallel to the transport direction during transport of the dough lump and maintaining one of the dough contact surfaces at a distance from the other contact surface which is smaller than at least a transverse dimension of the dough lump.

7. Method according to claim 6, wherein both of the contact surfaces are subjected to a reciprocating movement in a direction parallel to the transport direction.

8. Method according to claim 6 or 7, wherein the stroke of the reciprocating movement is about $2\pi$ times the distance between the dough contact surfaces.

9. Method according to claim 8, wherein both dough contact surfaces, apart from the reciprocating movement, are driven at an essentially equal speed and in a similar direction.

10. Method according to claim 9, wherein, when the strand of dough leaves the space between the dough contact surfaces, the dough contact surfaces are driven at different speeds.

11. Apparatus for forming a strand of dough (26) from a relatively short dough lump (25), comprising a first pressure member (21) and a second pressure member (22), provided with facing first (23) and second (24) dough contact surfaces, respectively, said first and second pressure members being formed by a conveyor belt (22) and a conveyor belt (21), respectively, for transporting the dough lump along a transport direction; means for driving both dough contact surfaces at an essentially equal transport speed and in a parallel manner, so that the conveyor belts (21, 22) remain, averaged in time, in a similar position in relation to each other; means for, during transport of the dough lump along said transport direction, superposing a reciprocating movement on the transport speed of at least one (23) of the dough contact surfaces, in a direction essentially parallel to the transport direction; and means for keeping the two dough contact surfaces spaced from each other in order to define a transforming space for the dough lump between them.

* * * * *